(12) United States Patent
Zarakhovsky et al.

(10) Patent No.: US 9,286,378 B1
(45) Date of Patent: Mar. 15, 2016

(54) SYSTEM AND METHODS FOR URL ENTITY EXTRACTION

(75) Inventors: Eugene Zarakhovsky, Seattle, WA (US); Allan Stewart, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 506 days.

(21) Appl. No.: 13/601,674

(22) Filed: Aug. 31, 2012

(51) Int. Cl.
G06F 15/16 (2006.01)
G06F 21/00 (2013.01)
G06F 17/30 (2006.01)
H04L 29/06 (2006.01)

(52) U.S. Cl.
CPC ...... G06F 17/30705 (2013.01); H04L 63/1441 (2013.01)

(58) Field of Classification Search
CPC ..................................................... G06F 15/16
USPC ........................................ 709/204, 218, 227
See application file for complete search history.

(56) References Cited

U.S. PATENT DOCUMENTS

| 6,035,330 | A | * | 3/2000 | Astiz et al. | 709/218 |
| 6,897,885 | B1 | * | 5/2005 | Hao et al. | 715/853 |
| 2005/0033745 | A1 | * | 2/2005 | Wiener et al. | 707/10 |
| 2007/0162448 | A1 | * | 7/2007 | Jain et al. | 707/7 |
| 2009/0204638 | A1 | * | 8/2009 | Hollier et al. | 707/104.1 |
| 2010/0153539 | A1 | * | 6/2010 | Zarroli et al. | 709/224 |
| 2011/0270691 | A1 | * | 11/2011 | Park | 705/14.73 |
| 2012/0041826 | A1 | * | 2/2012 | Valin et al. | 705/14.69 |
| 2013/0018967 | A1 | * | 1/2013 | Gannu et al. | 709/206 |
| 2013/0080364 | A1 | * | 3/2013 | Wilson et al. | 706/46 |
| 2013/0246898 | A1 | * | 9/2013 | Clifton-Bligh | 715/206 |
| 2013/0263263 | A1 | * | 10/2013 | Narkolayev et al. | 726/22 |

FOREIGN PATENT DOCUMENTS

GB 2456049 A * 7/2009

* cited by examiner

*Primary Examiner* — Ario Etienne
*Assistant Examiner* — Sahera Halim
(74) *Attorney, Agent, or Firm* — Fenwick & West LLP

(57) ABSTRACT

To allow for detection of links to spam within a social networking system by identifying entities based on uniform resource locators (URLs). Identifiers that include at least one parent entity identifier representing a parent entity and at least one child entity identifier representing a child entity are extracted from URLs. An identifier sequence including the at least one parent entity identifier is designated as an attributable sequence when the child entity accounts for a value of traffic received by the parent entity that does not satisfy a threshold. In an embodiment, the child entity may be identified as an actionable target. The URLs may be classified within a hierarchical structure based on the identifiers. The hierarchical structure may comprise at least one parent node representing the parent entity and at least one child node representing the child entity. The hierarchical structure may be a tree.

22 Claims, 6 Drawing Sheets

201 — http://nnn.stu.mno.com
202 — http://ggg.fff.ghi.com
203 — http://sss.pqr.mno.com
204 — http://abc.def.ghi.com
205 — http://uuu.xyz.ghi.com 206 — http://456.fff.ghi.com
207 — http://ttt.xyz.ghi.com
208 — http://789.pqr.mno.com/vwx
209 — http://jkl.stu.mno.com
210 — http://123.def.ghi.com
211 — http://789.pqr.mno.com/567

SYSTEM AND METHODS FOR URL ENTITY EXTRACTION

FIELD OF THE INVENTION

The present invention relates to the field of social networking. More particularly, the present invention provides a technique for identifying entities using uniform resource locators (URLs).

BACKGROUND

Internet social networks have become a significant phenomenon. Social networks allow an Internet user to create an account and a user profile and interact with other users of the social network. A social network user can share content and interact with content shared by other users. Social network users typically assemble a group of friends or followers with whom they interact. Once approved, the "friendship" typically gives both users access to each other's profiles and the content posted on them. Content postings and other user activities may generate stories that are visible to other users. Stories may include links to content internal or external to the social network. A user may view stories generated by the activities of his friends by accessing their profiles individually or by accessing his news feed, an interface that displays stories from several users and summarizes the activities of the user's friends. Friends can comment on a story, share a story, visit the links included in a story, or otherwise interact with each other's stories. In this way, social networks allow users to mimic real-life interactions in the context of an online community.

Social networks are providing users with increasingly sophisticated functionality. Early social networks offered little more than a simple interface for users to communicate and post messages. Now, on many social networks, users may share numerous different types of content and interact with each other's content in a variety of ways. Content shared on a social network may include links to external resources. The external resources may include entities that lie outside of the control of the social network. These entities may vary greatly in reputability and may serve both legitimate and illegitimate purposes. Many entities may seek to use social networks as a platform to further illegitimate purposes.

SUMMARY OF THE INVENTION

To allow for detection of links to spam within a social networking system, embodiments of the present invention include systems, methods, and computer readable media to facilitate identifying entities based on uniform resource locators (URLs). Identifiers that include at least one parent entity identifier representing a parent entity and at least one child entity identifier representing a child entity are extracted from URLs. An identifier sequence including the at least one parent entity identifier is designated as an attributable sequence when the child entity accounts for a value of traffic received by the parent entity that does not satisfy a threshold. In an embodiment, the child entity may be identified as a spammer.

In an embodiment, identifiers may be extracted from a URL from among the URLs, the URL may be classified within a hierarchical structure based on the identifiers from the URL, and the URL may be attributed to the attributable sequence based on the identifiers from the URL and the hierarchical structure. In an embodiment, the hierarchical structure may be a tree. In an embodiment, the hierarchical structure may comprise at least one parent node representing a parent entity identifier and at least one child node representing a child entity identifier. In an embodiment, the parent entity identifier may represent at least one of a top level domain, a base domain name, a sub-domain name, and a path. In an embodiment, the child entity identifier may represent at least one of a base domain name, a sub-domain name, and a path.

In an embodiment, the URLs may be classified within a hierarchical structure based on the identifiers. In an embodiment, the hierarchical structure may comprise at least one parent node representing the parent entity and at least one child node representing the child entity. In an embodiment, the hierarchical structure may be a tree.

In an embodiment, the attributable sequence may be added to an exceptions list. In an embodiment, the URLs may link to external entities. In an embodiment, the URLs may be associated with traffic data representing traffic from within a social networking system to external entities. In an embodiment, the parent entity may be associated with at least one of a top level domain, a base domain name, a sub-domain name, and a path. In an embodiment, the child entity may be associated with at least one of a base domain name, a sub-domain name, and a path.

In an embodiment, the attributable sequence may be associated with a hosting provider. In an embodiment, a sub-domain name may be designated as equivalent to a base domain name. In an embodiment, the threshold may be at least one of a traffic percentage and a traffic number.

Many other features and embodiments of the invention will be apparent from the accompanying drawings and from the following detailed description.

Figure 1:
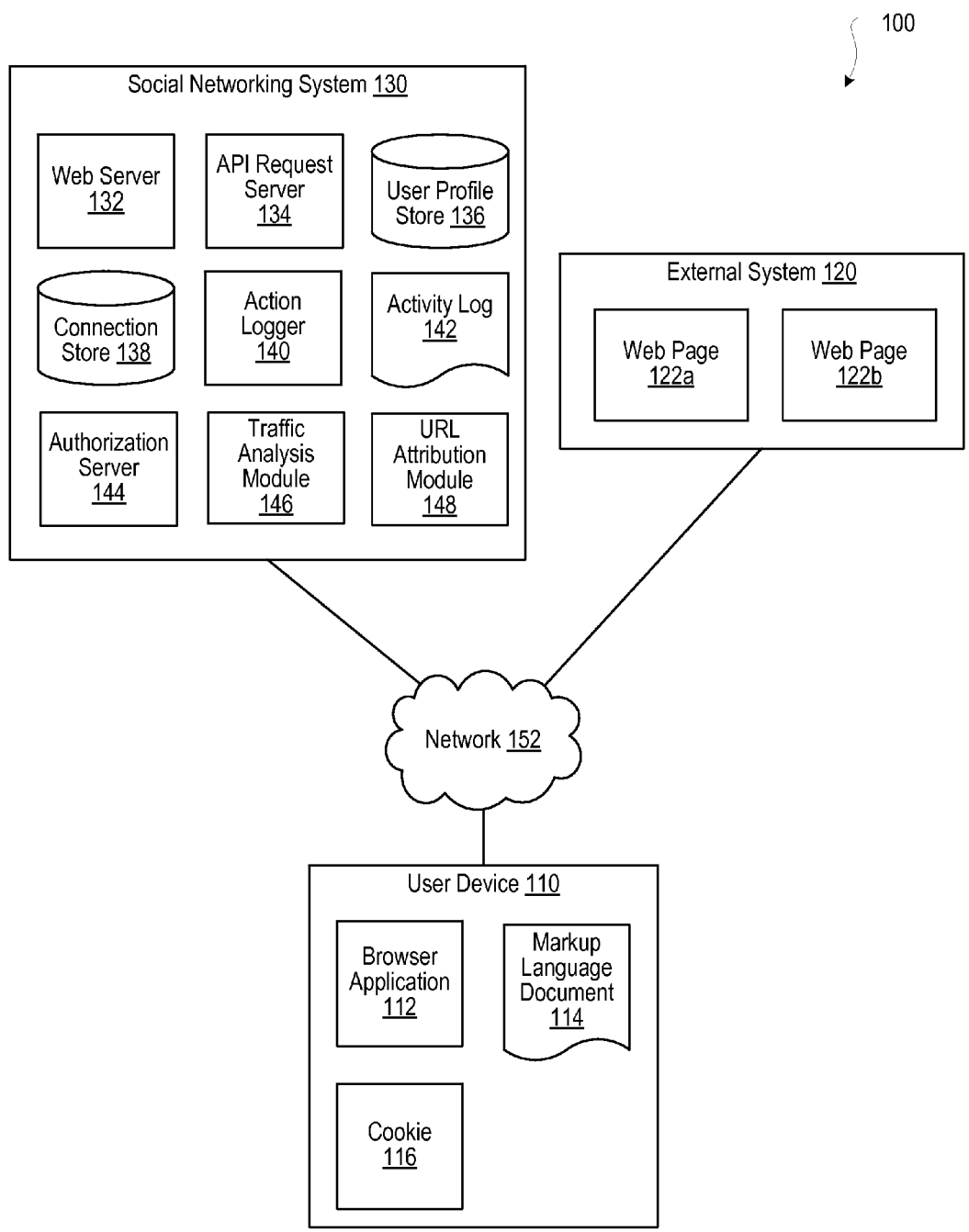
FIG. 1 depicts a diagram illustrating a system for identifying entities using URLs posted within a social networking system in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Social Networking—General Introduction

FIG. 1 is a network diagram of a system 100 for identifying entities using URLs posted within a social networking system in accordance with an embodiment of the invention. The system 100 includes one or more user devices 110, one or more external systems 120, the social networking system 130, and a network 150. For purposes of illustration, the embodiment of the system 100, shown by FIG. 1, includes a single external system 120 and a single user device 110. However, in other embodiments, the system 100 may include more user devices 110 and/or more external systems 120. In certain embodiments, the social networking system 130 is operated by a social network provider, whereas the external systems 120 are separate from the social networking system 130 in that they may be operated by different entities. In various embodiments, however, the social networking system 130 and the external systems 120 operate in conjunction to provide social networking services to users (or members) of the social networking system 130. In this sense, the social networking system 130 provides a platform or backbone, which other systems, such as external systems 120, may use to provide social networking services and functionalities to users across the Internet.

The user device 110 comprises one or more computing devices that can receive input from a user and transmit and receive data via the network 150. In one embodiment, the user device 110 is a conventional computer system executing, for example, a Microsoft Windows compatible operating system (OS), Apple OS X, and/or a Linux distribution. In another embodiment, the user device 110 can be a device having computer functionality, such as a smart-phone, a tablet, a personal digital assistant (PDA), a mobile telephone, etc. The user device 110 is configured to communicate via the network 150. The user device 110 can execute an application, for example, a browser application that allows a user of the user device 110 to interact with the social networking system 130. In another embodiment, the user device 110 interacts with the social networking system 130 through an application programming interface (API) provided by the native operating system of the user device 110, such as iOS and ANDROID. The user device 110 is configured to communicate with the external system 120 and the social networking system 130 via the network 150, which may comprise any combination of local area and/or wide area networks, using wired and/or wireless communication systems.

In one embodiment, the network 150 uses standard communications technologies and protocols. Thus, the network 150 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 150 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 150 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 110 may display content from the external system 120 and/or from the social networking system 130 by processing a markup language document 114 received from the external system 120 and from the social networking system 130 using a browser application 112. The markup language document 114 identifies content and one or more instructions describing formatting or presentation of the content. By executing the instructions included in the markup language document 114, the browser application 112 displays the identified content using the format or presentation described by the markup language document 114. For example, the markup language document 114 includes instructions for generating and displaying a web page having multiple frames that include text and/or image data retrieved from the external system 120 and the social networking system 130. In various embodiments, the markup language document 114 comprises a data file including extensible markup language (XML) data, extensible hypertext markup language (XHTML) data, or other markup language data. Additionally, the markup language document 114 may include JavaScript Object Notation (JSON) data, JSON with padding (JSONP), and JavaScript data to facilitate data-interchange between the external system 120 and the user device 110. The browser application 112 on the user device 110 may use a JavaScript compiler to decode the markup language document 114.

The markup language document 114 may also include, or link to, applications or application frameworks such as FLASH™ or Unity™ applications, the SilverLight™ application framework, etc.

In one embodiment, the user device 110 also includes one or more cookies 116 including data indicating whether a user of the user device 110 is logged into the social networking system 130, which may enable customization of the data communicated from the social networking system 130 to the user device 110. In one embodiment, the user device 110 also includes a news feed rendering module 118.

The external system 120 includes one or more web servers that include one or more web pages 122a, 122b, which are communicated to the user device 110 using the network 150. The external system 120 is separate from the social networking system 130. For example, the external system 120 is associated with a first domain, while the social networking system 130 is associated with a separate social networking domain. Web pages 122a, 122b, included in the external system 120, comprise markup language documents 114 identifying content and including instructions specifying formatting or presentation of the identified content.

The social networking system 130 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure.

Users may join the social networking system 130 and then add connections to any number of other users of the social networking system 130 to whom they desire to be connected. As used herein, the term "friend" refers to any other user of the social networking system 130 to whom a user has formed a connection, association, or relationship via the social networking system 130. For example, in an embodiment, if users in the social networking system 130 are represented as nodes in the social graph, the term "friend" can refer to an edge formed between and directly connecting two user nodes.

Connections may be added explicitly by a user or may be automatically created by the social networking system 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral ("two-way"), or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system 130 by Joe, but Joe does not wish to form a mutual connection, a unilateral connection may be established. The connection between users may be a direct connection; however, some embodiments of the social networking system 130 allow the connection to be indirect via one or more levels of connections or degrees of separation.

In addition to establishing and maintaining connections between users and allowing interactions between users, the social networking system 130 provides users with the ability to take actions on various types of items supported by the social networking system 130. These items may include groups or networks (i.e., social networks of people, entities, and concepts) to which users of the social networking system 130 may belong, events or calendar entries in which a user might be interested, computer-based applications that a user may use via the social networking system 130, transactions that allow users to buy or sell items via services provided by or through the social networking system 130, and interactions with advertisements that a user may perform on or off the social networking system 130. These are just a few examples of the items upon which a user may act on the social networking system 130, and many others are possible. A user may interact with anything that is capable of being represented in the social networking system 130 or in the external system 120, separate from the social networking system 130, or coupled to the social networking system 130 via the network 150.

The social networking system 130 is also capable of linking a variety of entities. For example, the social networking system 130 enables users to interact with each other as well as external systems 120 or other entities through an API, a web service, or other communication channels. The social networking system 130 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 130. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 130 modifies edges connecting the various nodes to reflect the relationships and interactions.

The social networking system 130 also includes user-generated content, which enhances a user's interactions with the social networking system 130. User-generated content may include anything a user can add, upload, send, or "post" to the social networking system 130. For example, a user communicates posts to the social networking system 130 from a user device 110. Posts may include data such as status updates or other textual data, location information, images such as photos, videos, links, music or other similar data and/or media. Content may also be added to the social networking system 130 by a third-party. Content "items" are represented as objects in the social networking system 130. In this way, users of the social networking system 130 are encouraged to communicate with each other by posting text and content items of various types of media through various communication channels. Such communication increases the interaction of users with each other and increases the frequency with which users interact with the social networking system 130.

The social networking system 130 includes a web server 132, an API request server 134, a user profile store 136, a connection store 138, an action logger 140, an activity log 142, an authorization server 144, a traffic analysis module 146, and a URL attribution module 148. In an embodiment of the invention, the social networking system 130 may include additional, fewer, or different components for various applications. Other components, such as network interfaces, security mechanisms, load balancers, failover servers, management and network operations consoles, and the like are not shown so as to not obscure the details of the system.

The user account store 136 maintains information about user accounts, including biographic, demographic, and other types of descriptive information, such as work experience, educational history, hobbies or preferences, location, and the like that has been declared by users or inferred by the social networking system 130. This information is stored in the user account store 136 such that each user is uniquely identified. The social networking system 130 also stores data describing one or more connections between different users in the connection store 138. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 130, such as non-person entities, buckets, cluster centers, images, interests, pages, external systems, concepts, and the like are also stored in the connection store 138.

The social networking system 130 maintains data about objects with which a user may interact. To maintain this data, the user account store 136 and the connection store 138 store instances of the corresponding type of objects maintained by the social networking system 130. Each object type has information fields that are suitable for storing information appropriate to the type of object. For example, the user account store 136 contains data structures with fields suitable for describing a user's account and information related to a user's account. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user profile in the user account store 136, assigns a unique identifier to the user account, and begins to populate the fields of the user account with information provided by the user.

The connection store 138 includes data structures suitable for describing a user's connections to other users, connections to external systems 120 or connections to other entities. The connection store 138 may also associate a connection type with a user's connections, which may be used in conjunction with the user's privacy setting to regulate access to information about the user. In an embodiment of the invention, the user account store 136 and the connection store 138 may be implemented as a federated database.

Data stored in the connection store 138, the user account store 136, and the activity log 142 enables the social networking system 130 to generate the social graph that uses nodes to identify various objects and edges connecting nodes to identify relationships between different objects. For example, if a first user establishes a connection with a second user in the social networking system 130, user accounts of the first user and the second user from the user account store 136 may act as nodes in the social graph. The connection between the first user and the second user stored by the connection store 138 is an edge between the nodes associated with the first user and the second user. Continuing this example, the second user may then send the first user a message within the social networking system 130. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented as a node in the social networking system 130. This tagging action may create edges between the first user and the second user as well as create an edge between each of the users and the image, which is also a node in the social graph. In yet another example, if a user confirms attending an event, the user and the event are nodes obtained from the user account store 136, where the attendance of the event is an edge between the nodes that may be retrieved from the activity log 142. By generating and maintaining the social graph, the social networking system 130 includes data describing many different types of objects and the interactions and connections among those objects, providing a rich source of socially relevant information.

The web server 132 links the social networking system 130 to one or more user devices 110 and/or one or more external systems 120 via the network 150. The web server 132 serves web pages, as well as other web-related content, such as Java, JavaScript, Flash, XML, and so forth. The web server 132 may include a mail server or other messaging functionality for receiving and routing messages between the social networking system 130 and one or more user devices 110. The messages can be instant messages, queued messages (e.g., email), text and SMS messages, or any other suitable messaging format.

The API request server 134 allows one or more external systems 120 and user devices 110 to call access information from the social networking system 130 by calling one or more API functions. The API request server 134 may also allow external systems 120 to send information to the social networking system 130 by calling APIs. The external system 120, in one embodiment, sends an API request to the social networking system 130 via the network 150, and the API request server 134 receives the API request. The API request server 134 processes the request by calling an API associated with the API request to generate an appropriate response, which the API request server 134 communicates to the external system 120 via the network 150. For example, responsive to an API request, the API request server 134 collects data associated with a user, such as the user's connections that have logged into the external system 120, and communicates the collected data to the external system 120. In another embodiment, the user device 110 communicates with the social networking system 130 via APIs in the same manner as external systems 120.

The action logger 140 is capable of receiving communications from the web server 132 about user actions on and/or off the social networking system 130. The action logger 140 populates the activity log 142 with information about user actions, enabling the social networking system 130 to discover various actions taken by its users within the social networking system 130 and outside of the social networking system 130. Any action that a particular user takes with respect to another node on the social networking system 130 may be associated with each user's account, through information maintained in the activity log 142 or in a similar database or other data repository. Examples of actions taken by a user within the social networking system 130 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 130, the action is recorded in the activity log 142. In one embodiment, the social networking system 130 maintains the activity log 142 as a database of entries. When an action is taken within the social networking system 130, an entry for the action is added to the activity log 142. The activity log 142 may be referred to as an action log.

Additionally, user actions may be associated with concepts and actions that occur within an entity outside of the social networking system 130, such as an external system 120 that is separate from the social networking system 130. For example, the action logger 140 may receive data describing a user's interaction with an external system 120 from the web server 132. In this example, the external system 120 reports a user's interaction according to structured actions and objects in the social graph.

Other examples of actions where a user interacts with an external system 120 include a user expressing an interest in an external system 120 or another entity, a user posting a comment to the social networking system 130 that discusses an external system 120 or a web page 122a within the external system 120, a user posting to the social networking system 130 a Uniform Resource Locator (URL) or other identifier associated with an external system 120, a user attending an event associated with an external system 120, or any other action by a user that is related to an external system 120. Thus, the activity log 142 may include actions describing interactions between a user of the social networking system 130 and an external system 120 that is separate from the social networking system 130.

The authorization server 144 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entities to comprise an enumeration of entities. For example, the user may provide a list of external systems 120 that are allowed to access certain information. Another embodiment allows the specification to comprise a set of entities along with exceptions that are not allowed to access the information. For example, a user may allow all external systems 120 to access the user's work information, but specify a list of external systems 120 that are not allowed to access the work information. Certain embodiments call the list of exceptions that are not allowed to access certain information a "block list". External systems 120 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 144 contains logic to determine if certain information associated with a user can be accessed by a user's friends, external systems 120, and/or other applications and entities. The external system 120 may need authorization from the authorization server 144 to access the user's more private and sensitive information, such as the user's work phone number. Based on the user's privacy settings, the authorization server 144 determines if another user, the external system 120, an application, or another entity is allowed to access information associated with the user, including information about actions taken by the user.

The social networking system 130 may include a traffic analysis module 146 and a URL attribution module 148. The traffic analysis 146 may analyze traffic data of users of the social networking system 130 and determine attributable sequences within links comprising the traffic data, as described in further detail below. The URL attribution module 148 may attribute a URL accessed from within the social networking system 130 to one of the attributable sequences, as described in further detail below.

URL Entity Extraction

As user adoption of social networks has grown, social networks have become an increasingly popular platform for entities to target users for illegitimate purposes. Entities may include any site, network, or other content provider that is not operated or controlled by the social networking system 130. Illegitimate purposes may include bulk marketing, virus delivery, data theft, or any other purpose that violates the policies of the social networking system 130. An entity may provide a user of the social networking system 130 with a link to content in the form of a uniform resource locator (URL). The URL may direct the user to a resource stored outside of the social networking system 130. The URL may be accompanied by a false or misleading description that leads the user to believe that the entity's purpose is legitimate or benign. The user may access the URL by clicking on it. Upon detecting that the URL has been accessed from within the social networking system 130, the external entity may present the user accessing the URL with unsolicited advertising or surreptitiously install scripts or other software on the user's device that further an illegitimate purpose. In addition, the accessing of the URL by the user may activate functionality that automatically replicates the URL and places it on the user's profile, potentially causing it to appear in the news feeds of other users. The URL may be accessed by other unsuspecting users from among the user's friends and others who see the URL in their news feed or on the user's profile, allowing the entity to continually increase the amount of traffic it receives from within the social networking system 130.

Entities that target users for illegitimate purposes, whose operators are often referred to as spammers, may diminish the quality of the user experience of the social networking system 130. A user may hesitate to click a URL if he is unsure that it genuinely leads to an entity with a legitimate purpose. If spammers are able to propagate URLs throughout the social networking system 130, the utility of content sharing functionality of the social networking system 130, such as the news feed, may be negatively affected. Identifying and taking action against entities such as spammers may facilitate limiting or preventing the flow of traffic from the social networking system 130 to spammer entities, which may provide a disincentive to spammers for targeting users of the social networking system 130. However, mistakenly identifying legitimate entities as spammers may also diminish the quality of the user experience for users of the social networking system 130, since users may be discouraged from posting URLs to legitimate entities if the URLs may be flagged as spam.

A URL may comprise a number of identifiers. The identifiers may include a top level domain and a base domain name. A top level domain is an administrative or country-specific identifier that identifies, at the highest level, the type of entity providing a resource. For example, in the URL http://abc.com, the top level domain is .com. A base domain name is a text-based character string that identifies the entity providing the resource. In the URL http://abc.com, the base domain name is abc. More particularly, the base domain name may identify the entity that provides the server hosting the resource. Some techniques for detecting spammers involve identifying spammer entities by their base domain names. Certain entities may come to be known as being operated by spammers. URLs linking to the base domain names used by these entities may be flagged as spam, and outgoing traffic to the base domain names may be blocked or prevented by, for example, warning users when they select a URL that has been flagged as spam.

However, these techniques have a number of disadvantages. To circumvent spam-detection techniques, many spammers may refrain from operating their services using dedicated base domain names. Instead, spammers may operate their services using base domain names that are shared between legitimate entities and spammers. Many Internet hosting providers may offer free or inexpensive hosting plans that do not include a unique base domain name but provide entities with hosting bandwidth under a sub-domain name. A sub-domain name is a type of domain name that is a child of a larger entity identified by a base domain name. For example, in the URL http://abc.defg.com, abc is a sub-domain name whose parent is the base domain name defg. A sub-domain name may represent an entity that is distinct from the base domain or may represent a section within the base domain. For example, in a URL with a base domain name and a sub-domain name, the base domain name may represent the hosting provider and the sub-domain name may represent an entity hosted by the hosting provider. The hosting provider may provide hosting services indiscriminately to legitimate entities and entities operated by spammers. Flagging all URLs linking to the hosting provider as spam may affect legitimate entities hosted by the hosting provider that users of the social networking system 130 may wish to access.

Another technique involves identifying and classifying specific URLs that link to entities operated by spammers. This approach avoids the problem of flagging URLs linking to legitimate entities as spam. However, the utility of such an approach may be limited because spammers may use numerous different URLs to direct traffic to the same resource. If one URL is flagged as spam, the spammer may use a different URL that links to the same resource. A spammer may use different URLs within the same base domain name and sub-domain name by generating different paths that all link to the same resource. A path is an identifier within a URL that immediately follows the top level domain and is delineated by a single forward slash ("/"). For example, in the URL http://abc.defg.com/hijk/lmno, the path is /hijk/lmno. Though a path may be formatted to represent the location of a resource within a directory-based file system, paths may not have any identifiable correlation with the actual location of a resource on a file server. Multiple distinct paths that link to the same resource may be easily created without copying or changing the location of the resource on the file server. To reliably identify URLs linking to an entity operated by a spammer, the social networking system 130 may need to continually flag the multiple URLs generated by the spammer that link to the same resource. Because multiple URLs may be generated very easily, attempting to limit traffic to entities operated by spammers by flagging particular URLs may require significant amounts of time, money, and data storage bandwidth.

According to one embodiment of the invention, identifiers are extracted from URLs and sequences of identifiers that represent distinct entities are determined. In an embodiment, a URL may be classified within a hierarchical structure. In an embodiment, the hierarchical structure may be modeled as a tree including a plurality of nodes representing a plurality of identifiers. The root node at the highest level of the tree may represent a top level domain. The nodes at each subsequent level may represent narrower delineations within which a URL may be classified. In an embodiment, nodes at the level immediately below the top level domain name—i.e., the child nodes of the node representing the top level domain name—may represent base domain names. The child nodes of the nodes representing the base domain names may represent sub-domain names that are children of the base domain name. The child nodes of nodes representing the base domain names or sub-domain names may represent paths or portions of paths. The top level domain, base domain name, sub-domain names, paths, and any additional identifiers included in the URL may be determined based on a syntactic analysis of the URL. Any technique for determining the identifiers included in a URL may be used. A URL may be classified within the hierarchical structure by associating the URL with the nodes representing the identifiers included in the URL.

Figures 2A, 2B:
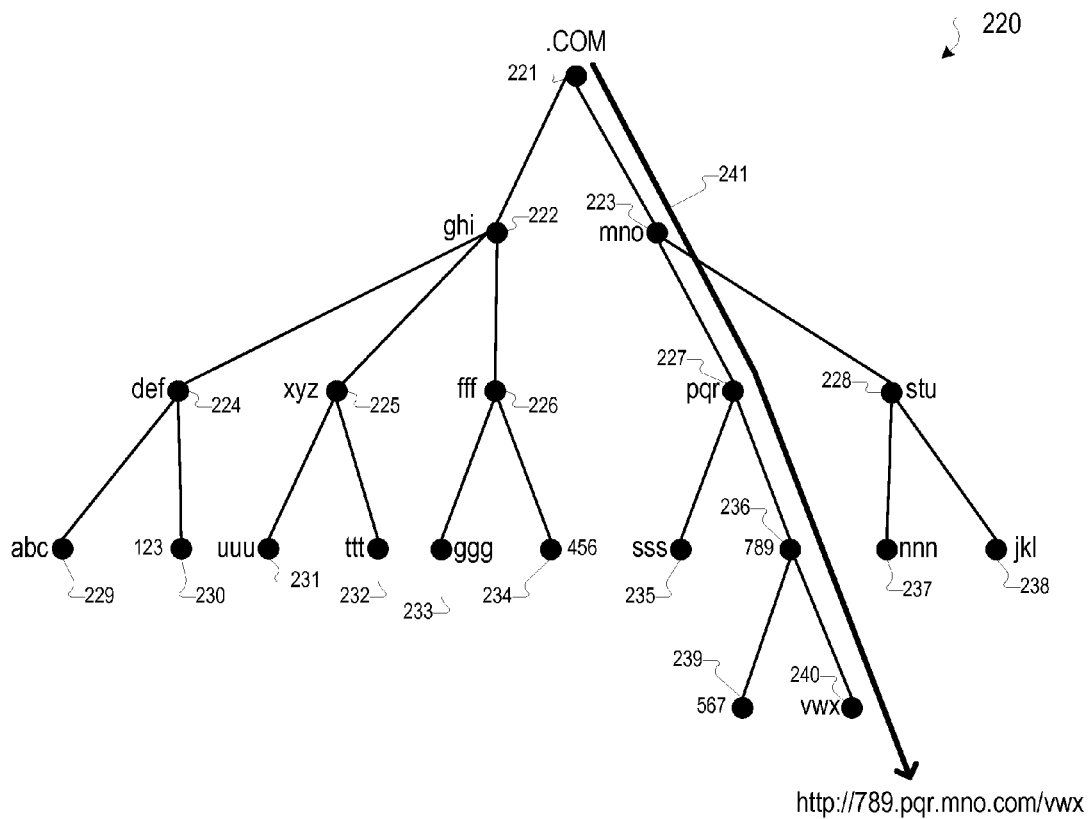
FIG. 2A depicts a list of URLs for classification in accordance with an embodiment of the invention.
FIG. 2B depicts a diagram illustrating a hierarchical structure for classifying URLs in accordance with an embodiment of the invention.

FIGS. 2A and 2B illustrate a list of URLs 201-211 and their classifications within a hierarchical structure 220, respectively. Each of the URLs 201-211 listed in FIG. 2A includes a top level domain, a base domain name, a first sub-domain name, and a second sub-domain name. The URLs 208 and 211 also include a path. In the hierarchical tree structure 220 depicted in FIG. 2B, a root node 221 represents a top level domain, .com. As shown, each of the child nodes 222-240 represents a base domain name, a sub-domain name, or a path. The child nodes 222 and 223 represent the base domain names ghi and mno, respectively. The child nodes 224-226 and 227-228 represent sub-domain names def, xyz, fff and pqr, stu, respectively, which are children of the base domain names ghi and mno, respectively. The child nodes 229-230, 231-232, 233-234 represent sub-domain names abc and 123, uuu and ttt, ggg and 456, respectively, which are children of the sub-domain names def, xyz, fff, respectively. The child nodes 235-236 and 237-238 represent sub-domain names sss and 789, nnn and jkl, respectively, which are children of the sub-domain names pqr and stu, respectively. The child nodes 239 and 240 represent paths 567 and vwx which are children of the sub-domain name 789. Because the nodes 229-235, 239-240, and 237-238 have no child nodes, they are terminal nodes.

Each of the URLs 201-211 in FIG. 2A may be classified within the hierarchical tree structure 200 first according to its top level domain, then according to its base domain name, then according to its first sub-domain name, then according to its second sub-domain name, then according to its path (if applicable). For example, the classification of the URL 208, http://789.pqr.mno.com/vwx, is indicated by the arrow 241: the URL is classified under its top level domain .com, its base domain name mno, its first sub-domain name pqr, its second sub-domain name 789, and its path vwx.

According to an embodiment of the invention, upon completing the classification, the social networking system 130 may attribute an accessed URL to a sequence of identifiers, represented by a sequence of nodes within the tree. The sequence of nodes may represent a sequence of a base domain name, sub-domain names, a path, or any sequence of identifiers within the URL. The sequence of identifiers to which an accessed URL is attributed may represent the most specific sequence of identifiers to which the operator of the social networking system 130 may attribute the URL. The social networking system 130 may have determined that the sequence of identifiers corresponds to a specific entity. If a number of URLs that link to illegitimate content share the same sequence of identifiers, the social networking system 130 may be able to determine that the sequence of identifiers corresponds to an entity operated by a spammer. The social networking system 130 may flag all URLs containing that sequence as spam without affecting URLs that only include a portion of the sequence. For example, in FIG. 2B, if the social networking system 130 determines that URLs of the form http://789.pqr.mno.com link to an entity operated by a spammer, the social networking system 130 may flag as spam all URLs of that form, such as http://789.pqr.mno.com/567 and http://789.pqr.mno.com/vwx, without affecting other URLs that share a base domain name or sub-domain name, such as http://sss.pqr.mno.com.

Figure 3:
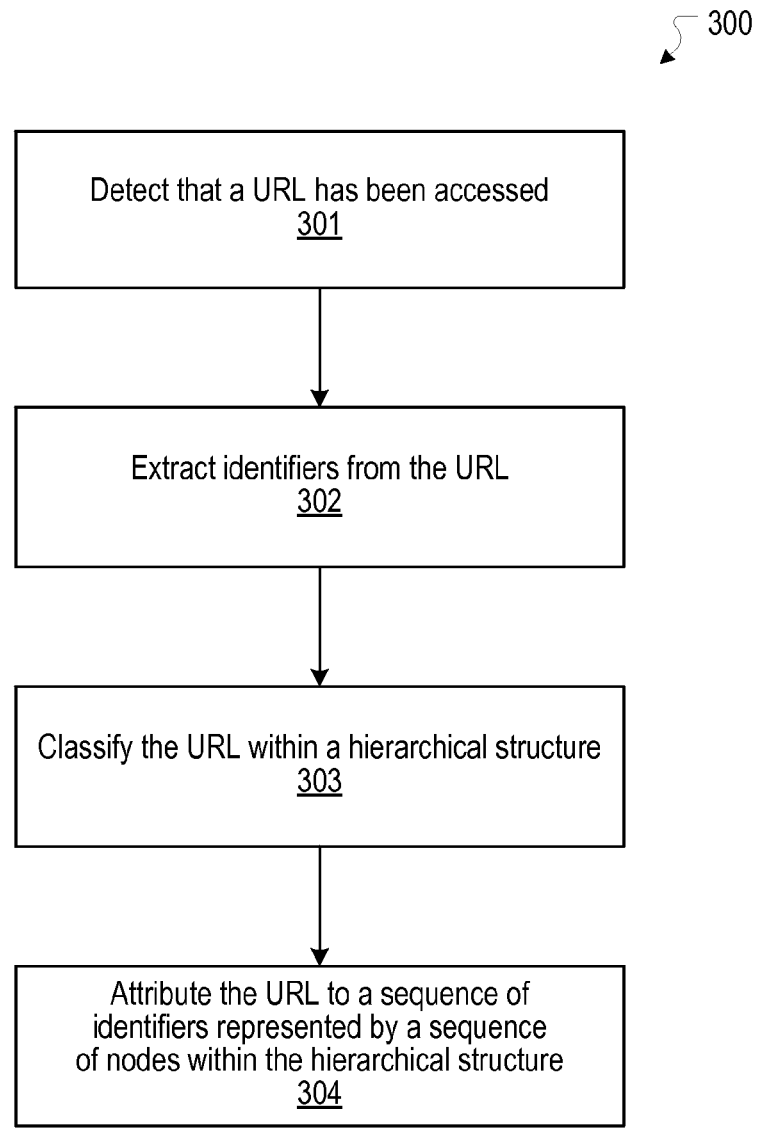
FIG. 3 depicts a flow diagram illustrating a process for attributing a URL in accordance with an embodiment of the invention.

FIG. 3 illustrates a process 300 for attributing a URL to a sequence of identifiers in accordance with an embodiment of the invention. Initially, a URL is embedded within content displayed to a user of the social networking system 130. The URL may have been posted on another user's profile, or may appear within a friend's news feed, or may have been embedded within a form. At block 301, the social networking system 130 detects that the URL has been accessed. The social networking system 130 may detect that the URL has been accessed based on receiving a click of the URL from a user. At block 302, the social networking system 130 extracts identifiers from the URL. The identifiers may represent a top level domain, a base domain name, a sub-domain name, or a path. At block 303, the social networking system 130 classifies the URL within a hierarchical structure. The URL may be classified according to a top level domain, a base domain name, a sub-domain name, or a path. The hierarchical structure may have been created in advance and may be continuously updated by the social networking system 130 to categorize the traffic that flows from the social networking system 130 to external entities. At block 304, the social networking system 130 attributes the URL to a sequence of identifiers represented by a sequence of nodes within the hierarchical structure. The specific sequence of identifiers may represent an entity with which the operator of the social networking system 130 may associate the URL. The procedure for determining attributable sequences of identifiers is described in further detail below. In an embodiment, the social networking system 130 may determine if the entity represented by the sequence is operated by an actionable target. In an embodiment, the actionable target may be a spammer. If the entity is operated by a spammer, then the social networking system 130 may flag the URL as spam. In an embodiment, the process 300 may be performed in whole or in part by the traffic analysis module 146, the URL attribution module 148, or any other module of the social networking system 130.

According to an embodiment of the invention, sequences of identifiers may be deemed attributable sequences. In an embodiment, an attributable sequence may correspond to an entity that is responsible for generating or placing a URL within the social networking system 130. For example, in the URL http://abc.defg.com, the sequence abc.defg.com may be deemed an attributable sequence if it represents an entity that is independently operated and includes content that draws traffic to the base domain name. According to an embodiment, a URL accessed from within the social networking system 130 may be attributed to an attributable sequence.

The social networking system 130 may identify between attributable sequences in a number of ways. According to one embodiment of the invention, the social networking system 130 may analyze all traffic that flowed from the social networking system 130 to external entities over a specific period of time. Traffic may comprise instances that URLs were accessed from within the social networking system 130. The social networking system 130 may extract identifiers from each URL that was accessed from within the social networking system 130 over the specified period of time and classify the URL within the hierarchical structure. For a parent node within the hierarchical structure, the social networking system 130 may determine whether the sequence represented by the parent node is an attributable sequence based on the distribution of URLs associated with the child nodes of the parent node. According to an embodiment, if none of the child nodes accounts for a sufficient or threshold percentage or amount of traffic that flowed from the social networking system 130 to the entity represented by the parent node, then the sequence represented by the parent node may be deemed an attributable sequence. According to an embodiment, if an entity represented by a child node accounts for a sufficient or threshold percentage or amount of traffic that flowed from the social networking system 130 to the entity represented by the parent node, then the sequence represented by the parent node may not be deemed an attributable sequence and the analysis may be repeated for each of the child nodes until an attributable sequence is identified. According to an embodiment, if there are multiple attributable sequences within a URL, the URL may be attributed to the most specific attributable sequence within the URL. According to an embodiment, if none of the sub-domain names that are children of a base domain name accounts for a sufficient or threshold percentage or amount of traffic that flowed from the social networking system 130 to the base domain name, then the base domain name may be deemed an attributable sequence. According to an embodiment, whether the proportion of traffic that an entity accounts for constitutes a sufficient percentage or amount may be assessed according to a predetermined threshold. Any threshold value may be used. The threshold value may be fixed, variable, or determined according to an algorithm. Any technique for determining the threshold value may be used.

Figures 4A, 4B:
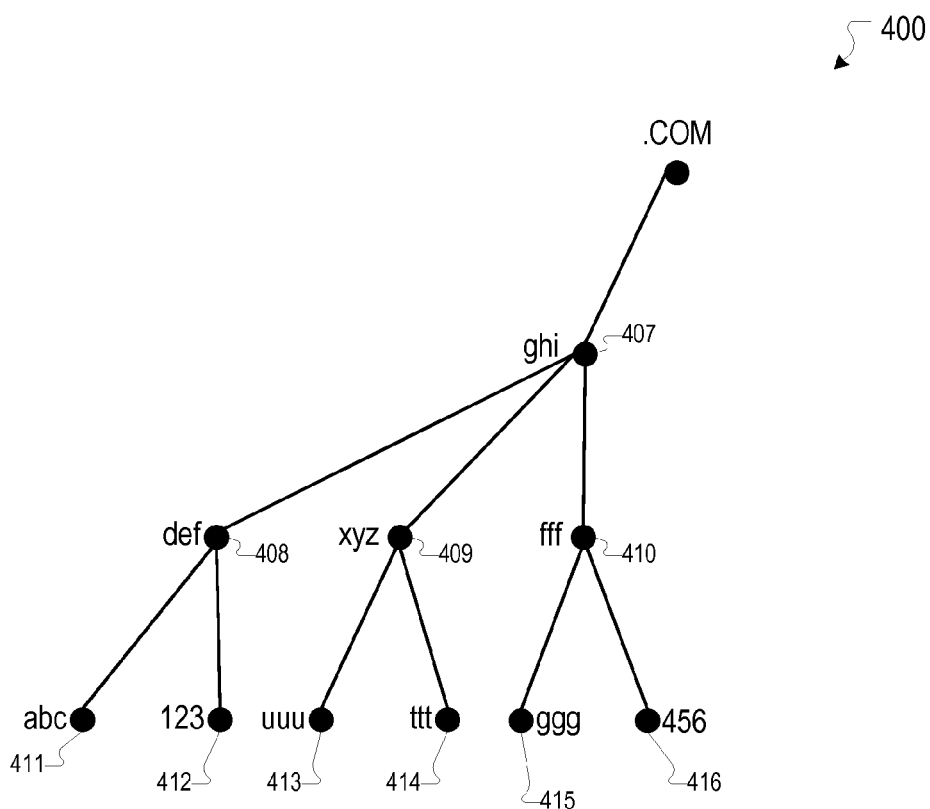
FIG. 4A depicts a list of URLs for classification in accordance with an embodiment of the invention.
FIG. 4B depicts a diagram illustrating a hierarchical structure for classifying URLs in accordance with an embodiment of the invention.

FIGS. 4A and 4B illustrate an example URL classification and structure in accordance with an embodiment of the invention. FIG. 4A lists six URLs 401-406. Together, the URLs account for 50 clicks. Each of the URLs includes the base domain name ghi. As shown, of the 50 clicks, URLs 401 and 402 including the sub-domain name def accounted for 10 clicks, URLs 403 and 404 including the sub-domain name xyz accounted for 20 clicks, and URLs 405 and 406 including the sub-domain name fff accounted for 20 clicks. Of the 10 clicks that the sub-domain name def accounted for, URL 401, which includes the sub-domain name abc, accounted for 5 clicks and URL 402, which includes the sub-domain name 123, accounted for 5 clicks. Of the 20 clicks that the sub-domain name xyz accounted for, URL 403, which includes the sub-domain name uuu, accounted for 15 clicks and URL 404, which includes the sub-domain name ttt, accounted for 5 clicks. Of the 20 clicks that the sub-domain name fff accounted for, URL 405, which includes the sub-domain name ggg, accounted for 3 clicks and URL 406, which includes the sub-domain name 456, accounted for 17 clicks.

FIG. 4B depicts an example hierarchical structure 400 within which the URLs 401-406 may be classified. Each of URLs 401-406 may be associated with node 407 representing the base domain name ghi. The URLs 401 and 402 may be associated with node 408 representing sub-domain name def. The URLs 403 and 404 may be associated with node 409 representing sub-domain name xyz. The URLs 405 and 406 may be associated with node 410 representing sub-domain name fff. The URL 401 may be associated with node 411 representing sub-domain name abc. The URL 402 may be associated with node 412 representing sub-domain name 123. The URL 403 may be associated with node 413 representing sub-domain name uuu. The URL 404 may be associated with node 414 representing sub-domain name ttt. The URL 405 may be associated with node 415 representing sub-domain name ggg. The URL 406 may be associated with node 416 representing sub-domain name 456.

In the illustrated example, for a sequence of identifiers corresponding to a parent entity to be deemed an attributable sequence, a sequence of identifiers corresponding to one of its children must not have accounted for a threshold percentage (e.g., 75%) of the traffic flowing to the parent entity. Because none of the sub-domain names def, xyz, and fff accounted for a sufficient percentage of the traffic that flowed from the social networking system 130 to the base domain name ghi, ghi.com may be deemed an attributable sequence. Each of the sub-domain names abc and 123 accounted for exactly 50% of the traffic that flowed from the social networking system 130 to the sub-domain name def. Because neither of the sub-domain names abc and 123 accounted for a sufficient percentage of the traffic that flowed from the social networking system 130 to the sub-domain name def, the sequence def.ghi.com may be deemed an attributable sequence. A URL containing the sub-domain def, such as http://abc.def.ghi-.com and http://123.def.ghi.com, may thus be attributed to the sequence def.ghi.com, which is the most specific attributable sequence within the URL.

The sub-domain names uuu and ttt accounted for 75% and 25%, respectively, of the traffic that flowed from the social networking system 130 to the sub-domain name xyz. According to one embodiment, because 75% satisfies the threshold percentage, the sequence xyz.ghi.com may not be deemed an attributable sequence. Because the sub-domains uuu and ttt do not have children, a URL containing the sub-domain uuu may thus be attributed to the sequence ghi.com. For example, if the user clicks a URL http://uuu.xyz.ghi.com/ura/jjf/ppp_ppp/pop.html, then because the sequence ghi.com representing the base domain ghi is the most specific attributable sequence in the URL, the URL may be attributed to the sequence ghi.com.

The sub-domain names ggg and 456 accounted for 15% and 85%, respectively, of the traffic that flowed from the social networking system 130 to the sub-domain name fff. According to one embodiment, because 85% satisfies the threshold percentage, the sequence fff.ghi.com may not be deemed an attributable sequence. A URL containing the sub-domain name 456 may thus be attributed to the sequence ghi.com. For example, if the user clicks a URL http://456.fff-.ghi.com/lya/qip/go_blue/maize.html, then because the sequence ghi.com representing the base domain ghi is the most specific attributable sequence in the URL, the URL may be attributed to the sequence ghi.com. Thus, even though the URLs http://123.def.ghi.com and http://456.fff.ghi.com/lya/qip/go_blue/maize.html both contain the base domain name ghi, they are attributed to different sequences of identifiers because the most specific attributable sequence within the URL http://123.defghi.com is def.ghi.com and the most specific attributable sequence within http://456.fff.ghi.com/lya/qip/go_blue/maize.html is ghi.com. In addition, although the URL http://123.def.ghi.com contains two attributable sequences—def.ghi.com and ghi.com—the URL may be attributed to the sequence def.ghi.com because def.ghi.com is the most specific attributable sequence within the URL.

According to an embodiment of the invention, a URL containing an attributable sequence may be flagged as spam if the attributable sequence has been determined by the social networking system 130 to represent an entity that is operated by a spammer. In an embodiment, the social networking system 130 may identify entities that are operated by spammers by historical analysis of traffic data. In an embodiment, traffic data comprises all of the instances that URLs were accessed from within the social networking system 130 over a suitable time period. Instances may include URL clicks, selections, postings, or any other technique by which traffic potentially or actually flows from the social networking system 130 to an entity. Traffic data may comprise all URLs accessed during the time period and the instances that they were accessed. Any technique for identifying entities operated by spammers may be used.

According to an embodiment of the invention, the social networking system 130 may maintain a list of attributable sequences. The list may be modified periodically to incorporate updated traffic information. In an embodiment, additional attributable sequences that include sub-domain names or paths included in existing attributable sequences may be added to the list. For example, if after determining that the identifier sequence 456.fff.ghi.com is an attributable sequence, the social networking system 130 determines that URLs including the identifier sequence 456.fff.ghi.com/ttt/ppp were frequently clicked, the social networking system 130 may determine that the sequence 456.fff.ghi.com/ttt/ppp is also an attributable sequence. The social networking system 130 may add the sequence 456.fff.ghi.com/ttt/ppp to the list. In an embodiment, the social networking system 130 uses the attributable sequences as exceptions in analyzing traffic data. In an embodiment, the social networking system 130 may ignore an attributable sequence within a URL when analyzing the URL. In an embodiment, the list may be kept in high-speed storage or other easily accessible media.

According to one embodiment of the invention, certain identifiers may be ignored or collapsed into a base domain name because they do not correspond to a meaningful entity. For example, many URLs may take the form http://www.abc.com, wherein www represents a standard abbreviation for 'World Wide Web'. The sub-domain name www may simply be collapsed into the base domain name abc because http://abc.com and http://www.abc.com are equivalent. As another example, the top level domain .com may be ignored because, as noted above, .com is a designation that applies to hundreds of millions of entities on the Internet.

Figure 5:
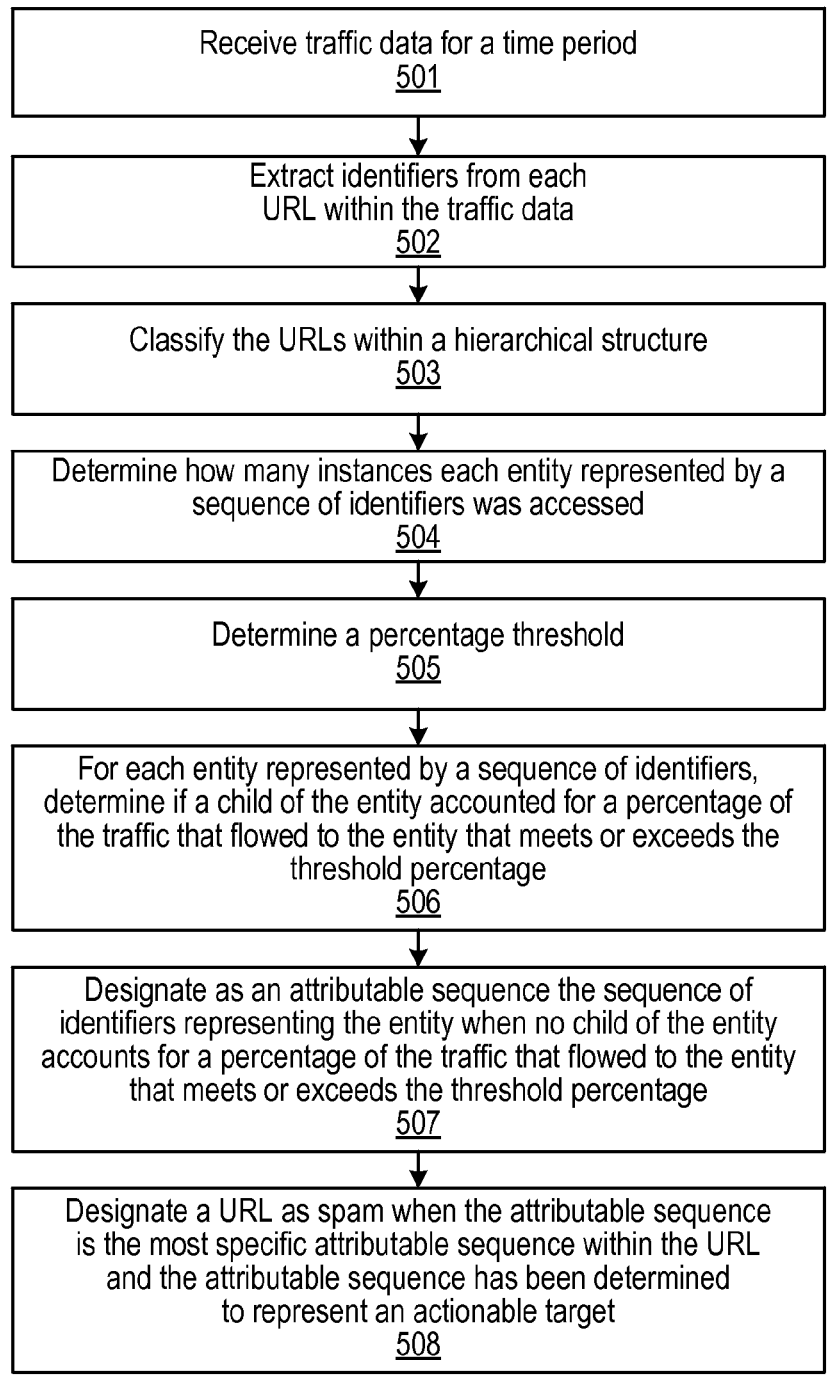
FIG. 5 depicts a flow diagram illustrating a process for determining an attributable sequence in accordance with an embodiment of the invention.

FIG. 5 illustrates a process 500 for determining an attributable sequence in accordance with an embodiment of the invention. At block 501, the social networking system 130 receives traffic data for a time period. Traffic data may comprise instances of URLs accessed from within the social networking system 130. The instances of URLs being accessed may comprise a click, a selection, posting, or any other technique by which URLs are accessed or shared from within the social networking system 130. The time period may be a week, a month, a year, or any length of time. At block 502, the social networking system 130 extracts identifiers from each URL within the traffic data. At block 503, the social networking system 130 classifies the URLs in a hierarchical structure. According to an embodiment, the hierarchical structure may comprise nodes that represent each sequence of identifiers extracted from the URLs within the traffic data. At block 504, the social networking system 130 determines how many instances each entity represented by a sequence of identifiers was accessed. The social networking system 130 may determine numbers of instances the children of each entity, e.g., sub-domains and paths, were accessed. At block 505, the social networking system 130 determines a threshold percentage, relating to the amount of traffic that flows to a child entity of an entity. At block 506, for each entity represented by a sequence of identifiers, the social networking system 130 determines if a child of the entity accounts for a percentage of the traffic that flowed to the entity that meets or exceeds the threshold percentage. At block 507, the social networking system 130 designates as an attributable sequence the sequence of identifiers representing the entity when no child of the entity accounts for a percentage of the traffic that flowed to the entity that meets or exceeds the threshold percentage. At block 508, the social networking system 130 designates a URL as spam when the attributable sequence is the most specific attributable sequence within the URL and the attributable sequence has been determined to represent an actionable target. In an embodiment, the actionable target may be a spammer entity. In an embodiment, the process 500 may be performed in whole or in part by the traffic analysis module 146, the URL attribution module 148, or any other module of the social networking system 130.

Hardware Implementation

Figure 6:
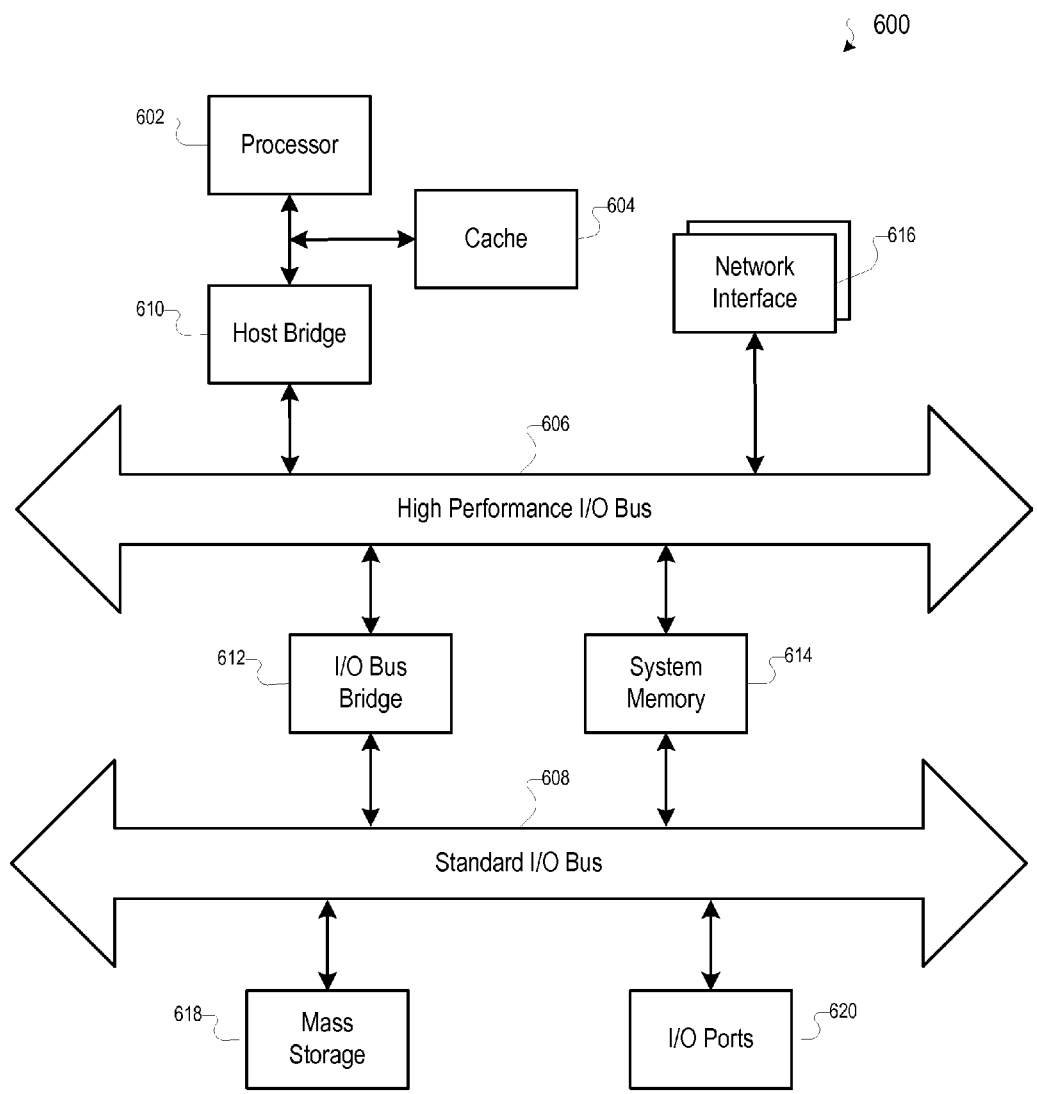
FIG. 6 depicts a diagram illustrating an example hardware implementation of the invention in accordance with an embodiment.

The foregoing processes and features can be implemented by a wide variety of machine and computer system architectures and in a wide variety of network and computing environments. FIG. 6 illustrates an example of a computer system 600 that may be used to implement one or more of the computing devices described herein. The computer system 600 includes sets of instructions for causing the computer system 600 to perform the processes and features discussed herein. The computer system 600 may be connected (e.g., networked) to other machines. In a networked deployment, the computer system 600 may operate in the capacity of a server machine or a client machine in a client-server network environment, or as a peer machine in a peer-to-peer (or distributed) network environment. In an embodiment of the invention, the computer system 600 may be the social networking system 130, the user device 60, and the external system 120, or a component thereof. In an embodiment of the invention, the computer system 600 may be one server among many that constitutes all or part of the social networking system 130.

The computer system 600 includes a processor 602, a cache memory 604, and one or more executable modules and drivers, stored on a computer-readable medium, directed to the processes and features described herein. Additionally, the computer system 600 includes a high performance input/output (I/O) bus 606 and a standard I/O bus 608. A host bridge 610 couples processor 602 to high performance I/O bus 606, whereas I/O bus bridge 612 couples the two buses 606 and 608 to each other. A system memory 614 and one or more network interfaces 616 couple to bus 606. The computer system 600 may further include video memory and a display device coupled to the video memory (not shown). Mass storage 618 and I/O ports 620 couple to the bus 608. The computer system 600 may optionally include a keyboard and pointing device, a display device, or other input/output devices (not shown) coupled to the bus 608. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 600, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 600 are described in greater detail below. In particular, the network interface 616 provides communication between the computer system 600 and any of a wide range of networks, such as an Ethernet (e.g., IEEE 802.3) network, a backplane, etc. The mass storage 618 provides permanent storage for the data and programming instructions to perform the above-described processes and features implemented by the respective computing systems identified above, whereas the system memory 614 (e.g., DRAM) provides temporary storage for the data and programming instructions when executed by the processor 602. The I/O ports 620 may be one or more serial and/or parallel communication ports that provide communication between additional peripheral devices, which may be coupled to the computer system 600.

The computer system 600 may include a variety of system architectures, and various components of the computer system 600 may be rearranged. For example, the cache 604 may be on-chip with processor 602. Alternatively, the cache 604 and the processor 602 may be packed together as a "processor module", with processor 602 being referred to as the "processor core". Furthermore, certain embodiments of the invention may neither require nor include all of the above components. For example, peripheral devices coupled to the standard I/O bus 608 may couple to the high performance I/O bus 606. In addition, in some embodiments, only a single bus may exist, with the components of the computer system 600 being coupled to the single bus. Furthermore, the computer system 600 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 600 that, when read and executed by one or more processors, cause the computer system 600 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 600, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 602. Initially, the series of instructions may be stored on a storage device, such as the mass storage 618. However, the series of instructions can be stored on any suitable computer readable storage medium. Furthermore, the series of instructions need not be stored locally, and could be received from a remote storage device, such as a server on a network, via the network interface 616. The instructions are copied from the storage device, such as the mass storage 618, into the system memory and then accessed and executed by processor 602.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described that may be preferences or requirements for some embodiments but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A distributed computer system implemented method comprising:
    extracting, by a computer system, identifiers from URLs, each of the identifiers identifying an entity associated with a URL from among the URLs;
    classifying the extracted identifiers of the URLs as parent identifiers and child identifiers;
    designating, by the computer system, a sequence of identifiers as attributable for a URL from among the URLs by:
    (1) determining whether any of one or more child identifiers of a parent identifier of the URLs account for more than a threshold percentage of traffic flowing from the computer system to an entity associated with the parent identifier,
    (2) responsive to a negative determination, designating a sequence of identifiers including the parent identifier as attributable, and
    (3) responsive to a positive determination, designating a sequence of identifiers including the one or more child identifiers as attributable; and
    attributing responsibility for each of the URLs to the entity associated with one of the designated attributable sequences of the URL.

2. The distributed computer system implemented method of claim 1, further comprising identifying an entity associated with the one or more the child identifiers as an actionable target.

3. The distributed computer system implemented method of claim 1, wherein the classifying further comprises:
    classifying the extracted identifiers within a hierarchical structure with the one or more child identifiers represented as children of the parent identifier or as children of other child identifiers attributing responsibility for each of the URLs to an entity associated with one of the designated attributable sequences of the URL based on the identifiers from the URL and the hierarchical structure.

4. The distributed computer system implemented method of claim 3, wherein the hierarchical structure is a tree.

5. The distributed computer system implemented method of claim 3, wherein the hierarchical structure comprises at least one parent node representing the parent identifier and at least one child node representing at least one of the child identifiers.

6. The distributed computer system implemented method of claim 1, wherein the parent identifier represents at least one of a top level domain, a base domain name, a sub-domain name, and a path.

7. The distributed computer system implemented method of claim 1, wherein the child identifiers represent at least one of a base domain name, a sub-domain name, and a path.

8. The distributed computer system implemented method of claim 1, wherein the classifying further comprises classifying the extracted identifiers within a hierarchical structure in which the parent identifier is a top level domain and the child identifiers are base domains, sub-domains, or paths.

9. The distributed computer system implemented method of claim 8, wherein the hierarchical structure comprises at least one parent node representing the parent identifier and at least one child node representing at least one of the child identifiers.

10. The distributed computer system implemented method of claim 8, wherein the hierarchical structure is a tree.

11. The distributed computer system implemented method of claim 1, further comprising adding the attributable sequence including identifiers associated with entities designated as attributable to an exceptions list.

12. The distributed computer system implemented method of claim 1, wherein the URLs on which the extraction is performed are presented to users of a social networking system; and wherein the URLs link to entities external to the social networking system.

13. The distributed computer system implemented method of claim 1, wherein the URLs are associated with traffic data representing traffic from within a social networking system to entities external to the social networking system.

14. The distributed computer system implemented method of claim 13, wherein the traffic data is measured in at least one of clicks, selections, and postings.

15. The distributed computer system implemented method of claim 1, wherein the attributable sequence is associated with a hosting provider.

16. The distributed computer system implemented method of claim 1, wherein the identifiers comprise sub-domain names and base domain names, and wherein the method further comprises designating a sub-domain name as equivalent to a base domain name.

17. The distributed computer system implemented method of claim 1, wherein the threshold percentage is at least one of a traffic percentage and a traffic number.

18. The distributed computer system implemented method of claim 1, wherein the traffic is analyzed over a specified period of time.

19. The distributed computer system implemented method of claim 1, further comprising analyzing historical traffic data for at least one of the parent identifiers and child identifiers.

20. The distributed computer system implemented method of claim 1, further comprising:
- determining whether the attributable sequence of a plurality of attributable sequences designated is a most specific attributable sequence within a URL of the URLs from which identifiers were extracted; and
- responsive to a determination that the attributable sequence of the plurality of attributable sequences is the most specific attributable sequence within the URL, designating the entity associated with attributable sequence as spam,
- wherein the most specific attributable sequence comprises a sequence of the plurality of attributable sequences that includes the most child identifiers.

21. A distributed computer system comprising:
- at least one processor; and
- a memory storing instructions configured to instruct the at least one processor to perform:
  - extracting identifiers from URLs, each of the identifiers identifying an entity associated with a URL from among the URLs;
  - classifying the extracted identifiers of the URLs as parent identifiers and child identifiers;
  - designating a sequence of identifiers as attributable for a URL from among the URLs by:
    - (1) determining whether any of one or more child identifiers of a parent identifier of the URLs account for more than a threshold percentage of traffic flowing form the system to an entity associated with the parent identifier,
    - (2) responsive to a negative determination, designating a sequence of identifiers including the parent identifier as attributable, and
    - (3) responsive to a positive determination, designating a sequence of identifiers including the one or more child identifiers as attributable; and attributing responsibility for each of the URLs to the entity associated with one of the designated attributable sequences of the URL.

22. A non-transitory computer readable storage medium storing computer-executable instructions that, when executed, cause a distributed computer system to perform a computer-implemented method comprising:
- extracting identifiers from URLs, each of the identifiers identifying an entity associated with a URL from among the URLs; classifying the extracted identifiers of the URLs as parent identifiers and child identifiers;
- designating a sequence of identifiers as attributable for a URL from among the URLs by:
  - (1) determining whether any of one or more child identifiers of a parent identifier of the URLs accounts for more than a threshold percentage of traffic flowing form the computer system to an entity associated with the parent identifier,
  - (2) responsive to a negative determination, designating a sequence of identifiers including the parent identifier as attributable, and
  - (3) responsive to a positive determination, designating a sequence of identifiers including the one or more child identifiers as attributable; and
- attributing responsibility for each of the URLs to the entity associated with one of the designated attributable sequences of the URL.

* * * * *